United States Patent [19]

Aoshima et al.

[11] Patent Number: 4,619,509
[45] Date of Patent: Oct. 28, 1986

[54] FILM WINDING DEVICE FOR CAMERA

[75] Inventors: Chikara Aoshima; Toru Nagata, both of Kanagawa, Japan

[73] Assignee: Canon Kabushiki Kaisha, Tokyo, Japan

[21] Appl. No.: 746,922

[22] Filed: Jun. 19, 1985

Related U.S. Application Data

[63] Continuation of Ser. No. 495,430, May 17, 1983, abandoned.

[30] Foreign Application Priority Data

May 24, 1982 [JP] Japan ................................. 57-87521

[51] Int. Cl.4 ......................... G03B 1/00; G03B 17/24
[52] U.S. Cl. ................................ 354/173.1; 354/206; 354/213; 354/214
[58] Field of Search ................ 354/171, 173.1, 173.11, 354/204–206, 212–214, 217; 242/71, 71.1, 71.4–71.6

[56] References Cited

U.S. PATENT DOCUMENTS

| | | | |
|---|---|---|---|
| 3,135,182 | 6/1964 | Hintze et al. | 354/217 |
| 3,511,153 | 5/1970 | Steisslinger et al. | 354/217 X |
| 3,981,022 | 9/1976 | Iwashita et al. | 354/171 |
| 4,324,469 | 4/1982 | Harvey | 354/214 |
| 4,400,074 | 8/1983 | Akiyama et al. | 354/214 X |
| 4,416,525 | 11/1983 | Chan | 354/214 X |
| 4,497,555 | 2/1985 | Akiyama | 354/173.1 |

FOREIGN PATENT DOCUMENTS 56-125730 10/1981 Japan .

Primary Examiner—William B. Perkey
Attorney, Agent, or Firm—Toren, McGeady, Stanger, Goldberg & Kiel

[57] ABSTRACT

A film winding device for a camera including a drive source; a sprocket arranged to be rotated by a film when the film is wound up on a spool of the camera; and a one-way clutch arranged to make the driving force of the drive source transmissible to the sprocket when the input shaft thereof is rotated in the direction of film winding and to remain in a non-transmissive state by virtue of the absolute rotating direction of the input shaft thereof when the input shaft rotates in the direction of film rewinding.

7 Claims, 8 Drawing Figures

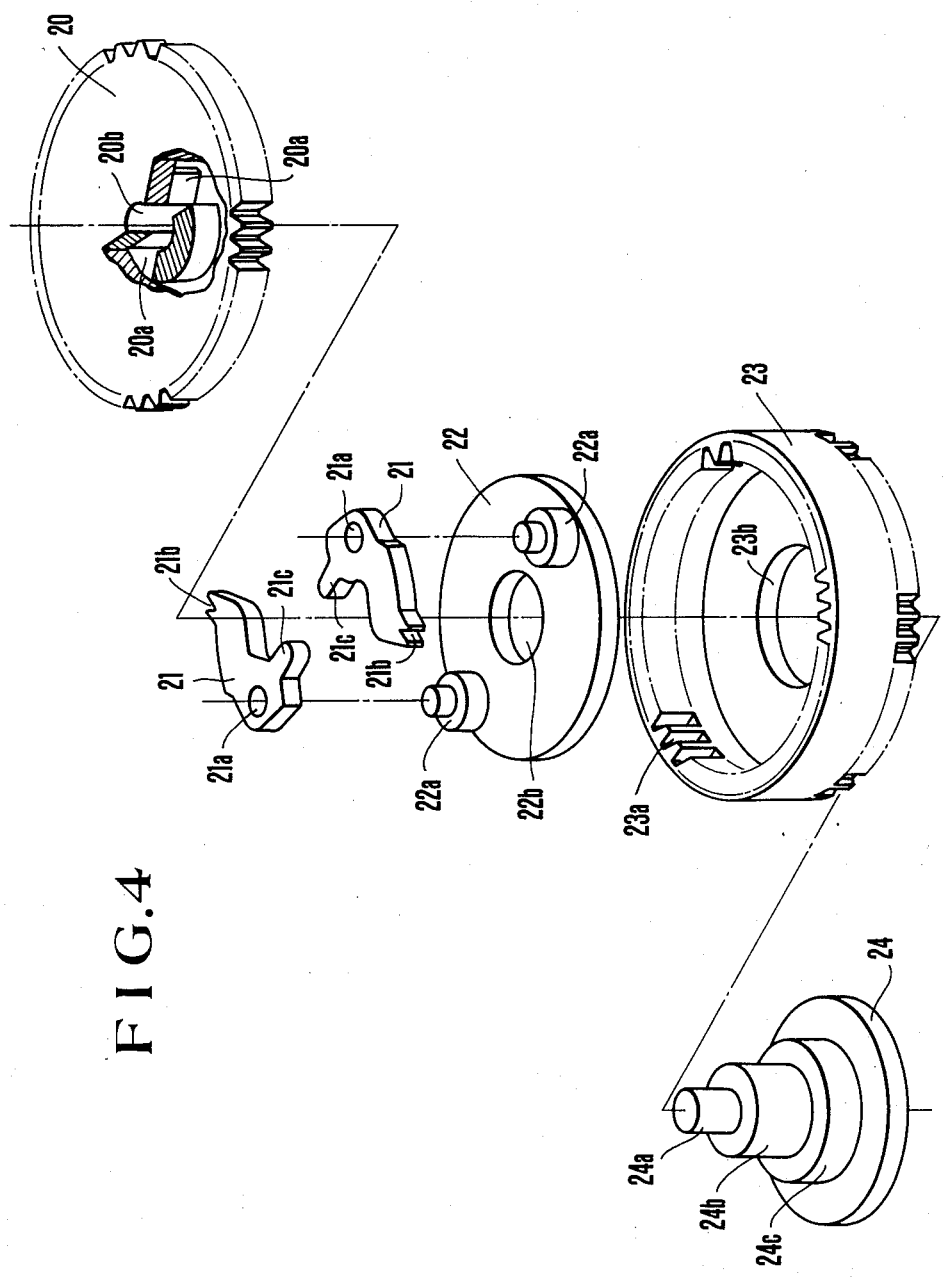
F I G. 4

FILM WINDING DEVICE FOR CAMERA

This is a continuation of application Ser. No. 495,430, filed May 17, 1983, now abandoned.

BACKGROUND OF THE INVENTION

1. Field of the Invention

This invention relates to a film winding device for a camera.

2. Description of the Prior Art

Heretofore there have been known various film winding devices of the kind called spool drive type which transmit a driving force to a spool to feed the film and also rotate a sprocket through the medium of the film being fed in such a manner that the photo taking mechanisms of the camera such as an automatic focusing mechanism, a shutter mechanism, etc. are charge while the film is fed to a prescribed extent. Compared with winding devices of another kind called sprocket drive type, the spool drive type winding device can be arranged in a simple structure highly suitable for small cameras such as the lens shutter type camera. However, a disadvantage of the device of this type arises in that since the spool drive type winding device has a sprocket arranged to be rotated by the film being fed, it is incapable of charging the photo taking mechanism when the camera is not loaded with film. In such an instance, therefore, the spool drive type device does not permit testing the shutter, the automatic focusing mechanism, etc. Besides, with no film loaded, a winding stop mechanism which is arranged to stop the winding action every time one frame portion of the film has been fed does not operate and thus would result in an incessant operation of a motor in cases where a winding action is arranged to be accomplished by the driving force of a motor or the like.

Particularly, in the case of a camera having an automatic loading mechanism which performs film winding by bringing the force end of the film into contact with the periphery of a spool and by having the film wound round the spool by virtue of a frictional force is such a manner as disclosed, for example, in U.S. Pat. No. 3,567,147, the device is arranged not to have the film wound up with the back cover of the camera left open. In such a case, therefore, if the winding action is allowed to begin with the back cover left open at the time of film loading, electric power would be wastefully consumed with the spool continuously rotated by the motor.

To solve the above-stated problem, it is conceivable to arrange a winding device of the spool driving type in a manner wherein a drive source is connected to a sprocket through a one-way clutch in the winding device. When the sprocket is rotated by the feeding movement of the film, the output shaft of a one-way clutch which operates in response to the sprocket is arranged to rotate faster than the input shaft of the one-way clutch arranged to have the driving force of the drive source transmitted directly thereto. The one-way clutch is thus arranged to be in a non-transmissive state and the sprocket to be rotated by the film during film winding. In cases where the film is not loaded, the one-way clutch is brought into a transmissive state to have the driving force transmitted directly to the sprocket to cause the sprocket to be rotated thereby. However, a device based on that concept inevitably results in inconvenience, because the conventional one-way clutch is arranged to be switched over between the transmissive and non-transmissive states according to the speed of the output shaft relative to that of the input shaft thereof.

With that device employed, when the film is rewound, the output shaft which operates in response to the rotation of the sprocket rotates in a direction opposite to its rotating direction for film winding. Therefore, this brings the one-way clutch into a transmissive state. As a result of this, the drive source which is connected to the input shaft acts restrictively on the film rewinding operation. The restrictive action of the drive source inhibits the film rewinding operation from being accomplished at a high speed. Besides, such rewinding tends to damage the film as the film is pulled by the sprocket and by a fork provided on the rewinding side.

SUMMARY OF THE INVENTION

The present invention is directed to providing a solution to the above-stated problems presented by the prior art. It is therefore an object of the invention to provide a spool drive type film winding device for a camera which is capable of performing a winding action irrespective of whether the camera is loaded with film and is also capable of performing a film rewinding action without any difficulty.

The above and further objects and novel features of the invention will be apparent from the following detailed description of a preferred embodiment thereof taken in connection with the accompanying drawings.

BRIEF DESCRIPTION OF THE DRAWINGS

FIG. 4 is an oblique view showing by way of example a one-way clutch arranged in the embodiment shown in FIG. 1.

DESCRIPTION OF THE PREFERRED EMBODIMENT

Figure 1:
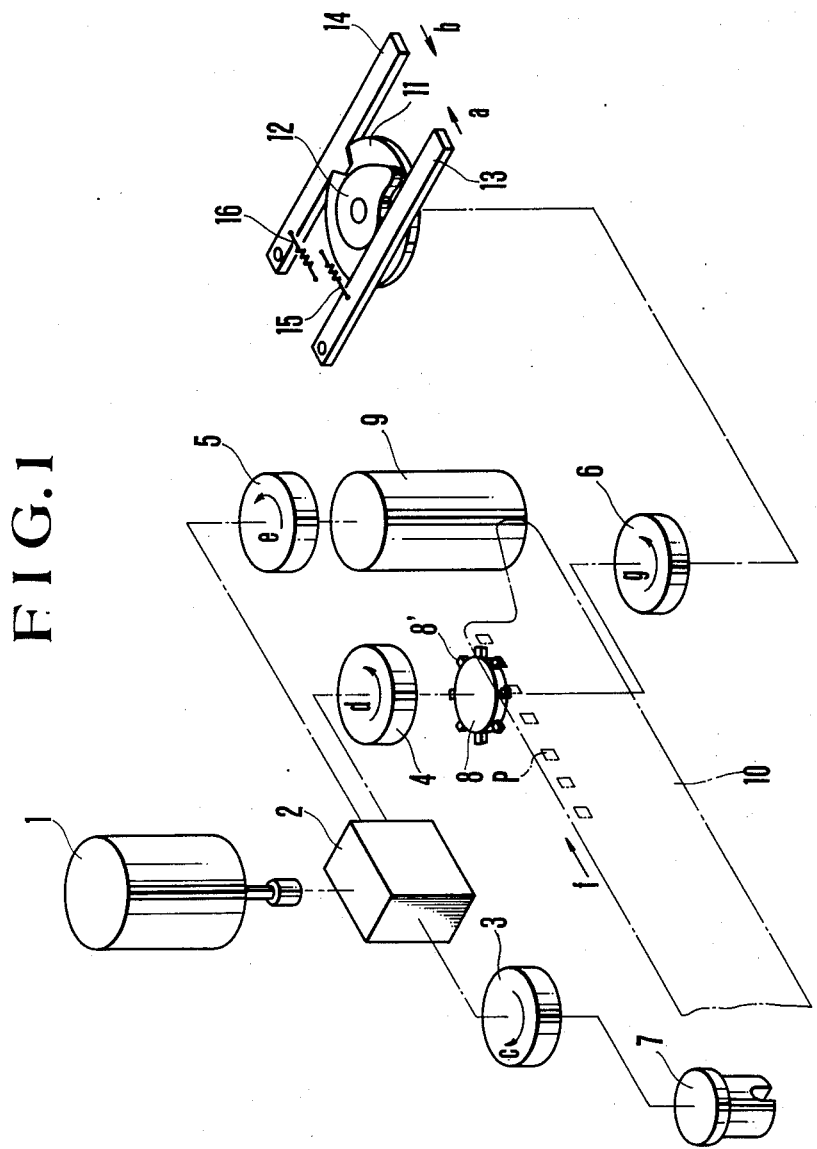
FIG. 1 is an oblique view schematically showing a film winding device for a camera which is an embodiment of the invention.

Referring to FIG. 1 which shows a film winding device for a camera which is an embodiment of the present invention, the embodiment includes a motor 1 which serves as a source of driving power, a gear train 2 which transmits rotation of the motor 1 by reducing the speed thereof to be suitable for winding and rewinding operation, and one-way clutches 3, 4 and 5 which are arranged in a manner as disclosed in Japanese patent application No. SHO 56-184633 and which will be described hereinafter. The input shaft of each of the one-way clutches 3, 4 and 5 is connected to the motor 1 through the gear train 2. Meanwhile, the output shaft of the one-way clutch 3 is connected to a rewinding fork 7 engaging a spool provided within a film magazine which is not shown. The output shaft of the clutch 4 is connected to a sprocket 8 and that of the clutch 5 to a take-up spool 9. These one-way clutches 3, 4 and 5 are arranged to transmit the rotation of their input shafts to the output shafts when the input shafts are rotated in the directions of arrows c, d and e respectively. At the time of film winding, the clutches 4 and 5 cause the sprocket 8 and spool 9 to rotate counterclockwise by transmitting the rotation of the motor 1 thereto. At the time of rewinding, the one-way clutch 3 causes the rewinding fork 7 to rotate clockwise by transmitting the rotation of the motor 1 to the fork 7. In this specific embodiment, when the sprocket 8 is rotated by the feeding movement of the film 10, the rotating speed and the diameter of the take-up spool 9 are arranged such that the output shaft of the one-way clutch 4 rotates at a speed faster than the input shaft of the clutch 4 which rotates together with the motor 1.

The embodiment further includes another one-way clutch 6 which is connected to the sprocket 8. When the input shaft thereof rotates in the direction of arrow g in response to the rotation of the sprocket 8, the rotation of the sprocket 8 is transmitted through the clutch 6 to a dividing plate 11. A known one-way clutch such as ratchet mechanism may be employed as the one-way clutch 6 so long as the transmissive state is shiftable by the rotating direction of the sprocket 8 in such a way as to change it to a transmissive state at the time of winding and to a non-transmissive state at the time of rewinding. As shown in detail in FIG. 2, a charge cam 12 is arranged to rotate in association with the above-stated dividing plate 11. At the time of film winding, the rotation of the sprocket 8 is transmitted to cause the charge cam 12 to rotate counterclockwise or in the direction of arrow h. A charging operation lever 13 is pivotally carried by a carrying shaft 13c. A spring 15 exerts an urging force on the charging operation lever 13 in the counterclockwise direction of arrow a. The side face 13a of the lever 13 is thus arranged to abut upon the periphery of the charge cam 12. There is provided another lever 14 for stopping film winding. The winding stop lever 14 has a protrudent part 14a which is arranged to engage a groove 11a provided in the dividing plate 11. The lever 14 is pivotally carried by a carrying shaft 14c and is urged by a spring 16 to move in the clockwise direction of arrow b. Further, one end of the winding stop lever 14 is arranged to be able to come into contact with an operating piece 28a of a switch 28. When the protrudent part 14a is inserted in the groove 11a, the operating piece 28a is brought into contact with a terminal 28c. The winding stop lever 14 is then turned counterclockwise. When the protrudent part 14a is in contact with the periphery of the dividing plate 11, the operating piece 28a is pushed into contact with a terminal 28b of the switch 28.

The embodiment is provided with a charge plate 17 for charging an automatic focusing mechanism (hereinafter called the AF mechanism) and a shutter mechanism which are not shown. The charge plate 17 is slidably carried by carrying pins 18 while it is urged to move in the direction of arrow j by a spring 19. The charge plate 17 is locked in the position as shown in the drawing by a lock mechanism, which is not shown, upon completion of charging the AF mechanism and the shutter mechanism. When the charge plate 17 is released from the locked state upon completion of the travel of the shutter, the spring 19 causes the plate 17 to travel in the direction of the arrow j to push the end part 14b of the winding stop lever 14. This causes the lever 14 to turn counterclockwise. The charge plate is provided with an engaging piece 17a which is arranged to engage the end part 13b of the operation lever 13. When the operation lever 13 is pushed to turn clockwise by the cam face 12a of the charge cam 12, the operation lever 13 moves the charge plate 17 against the force of the spring 9 through the engaging piece 17a.

Figure 3:
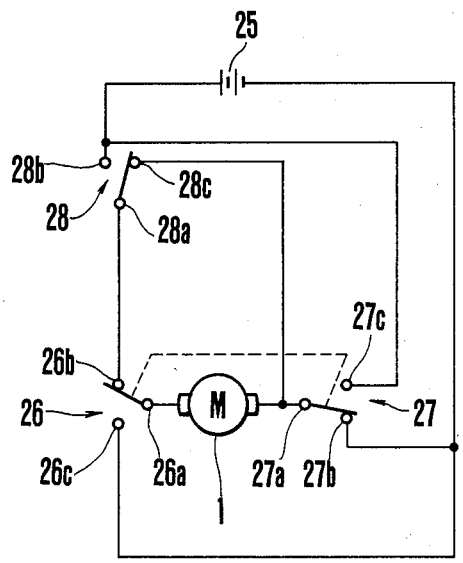
FIG. 3 is a diagram showing a motor control circuit arranged in the embodiment shown in FIG. 1.

This embodiment is provided with a motor control circuit which is as shown in FIG. 3. Referring to FIG. 3, the circuit comprises a power source battery 25; the switch 28 which is arranged to be operated by the winding stop lever 14 as mentioned in the foregoing for winding the film as much as one frame portion thereof; and switches 26 and 27 which are arranged to change the power supply direction to the motor 1 in response to the operation of a rewinding operation member which is not shown. At the time of winding, the operating pieces 26a and 27a of these switches 26 and 27 are respectively connected to the terminals 26b and 27b of the switches. The operating pieces 26a and 27b come into contact with the terminals 26c and 27c of the switches in response to a rewinding operation of the rewinding operation member.

Before going to the description of the operation of the embodiment which is arranged as has been described above, there will be further described the structural arrangement of the one-way clutches 3, 4 and 5 taking the clutch 3 as an example of their arrangement. Referring now to FIG. 4 which shows the clutch, the arrangement includes an input gear 20 which is arranged to engage the above-stated gear train and is provided with a cut-out part 20a formed in a hub on its lower side for transmitting the driving force. A pawl member 21 is arranged to transmit the rotating force of the input gear 20 to the output side of the clutch arrangement and is pivotally carried by the carrying shaft 22a of a pawl carrying plate 22 through a hole 21a. An output gear 23 is provided with a ratchet 23a formed in the inner circumferential wall to confront the pawl member 21. The claw 21b of the pawl member 21 is arranged to be in the same relation to the ratchet 23a as those used in an ordinary ratchet mechanism. A protrudent part 21c of the pawl member 21 is inserted in the cut-out part 20a of the input gear 20. The engagement and disengagement between the claw 21b of the pawl member 21 and the ratchet 23a are arranged to be controlled by turning the pawl member 21 on the carrying shaft 22a according to the rotating direction of the input gear 20. The clutch arrangement further includes a carrying shaft 24 which is arranged to rotatably carry the input gear 20, the pawl carrying plate 22 and the output gear 23. The carrying shaft 24 carries the input gear 20 by its circumferential face 24a, through the hole 20a of the input gear 20, the pawl carrying plate 22 by its circumferential face 24b through the hole 22b of the plate 22, and the output gear 23 by its circumferential face 24c through the hole 23b of the gear 23 respectively.

Figure 5A:
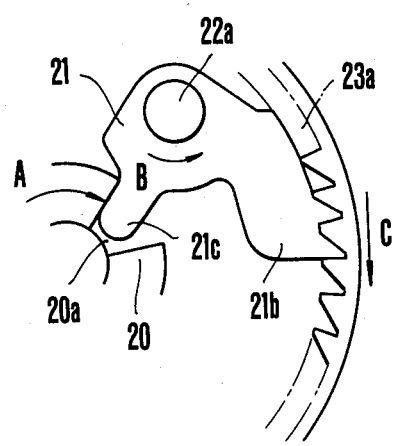
FIGS. 5(a) and (b) are plan views showing the operation of the one-way clutch of FIG. 4.
Figure 5B:
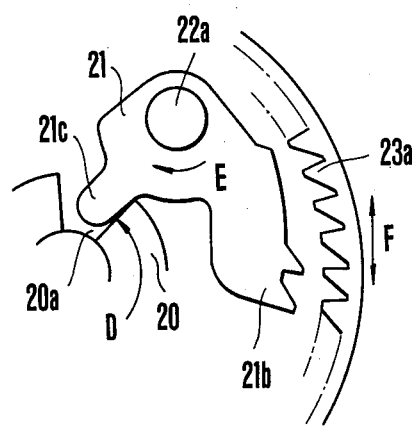

Referring to FIGS. 5(a) and 5(b), the one-way clutch 3 operates in the following manner: In the case of this particular embodiment, the clutch 3 is connected by the clockwise rotation of the input gear 20 and is disconnected by the counterclockwise rotation of the input gear 20. The clutch 3 is shown in FIG. 5(a) as in a connected state and in FIG. 5(b) as in a disconnected state. When the input gear 20 begins to rotate clockwise (or in the direction of arrow A) in the state shown in FIG. 5(b), the protrudent part 21c is pushed by one end of the cut-out part 20a to cause the pawl member 21 to turn counterclockwise (or in the direction of arrow B) on the carrying shaft 22a. The claw 21b of the member 21 then comes to engage the ratchet 23a. After that, the input gear 20, the pawl member 21, the pawl carrying plate 22 and the output gear 23 all turn together in the clockwise direction of arrow C. If the rotation of the input gear 20 comes to a stop under that condition, the engagement between the claw 21b and the ratchet 23a is still maintained. Therefore, when the input gear 20 again comes to rotate clockwise, the output gear 23 can be rotated without any time lag.

Conversely, when the input gear 20 begins to rotate counterclockwise (in the direction of arrow D) under this condition, the protrudent part 21c of the pawl member 21 is pushed by the other end of the cut-out part 20a to cause the pawl member 21 to turn clockwise (in the direction of arrow E) on the shaft 22a. At the same time, the pawl carrying plate 22 turns counterclockwise to disengage the claw 21b from the ratchet 23a. Therefore, the counterclockwise rotation of the input gear 20 is not transmitted to the output gear 23 and the output gear 23 becomes free to rotate in the direction of arrow F. Accordingly, even if some rotating force is exerted on the output gear 23 under this condition, the rotation of the input gear 20 would remain unaffected thereby. Further, this condition remains unchanged even after the rotation of the input gear 20 comes to a stop and continues until the input gear 20 begins to rotate clockwise next time. Again referring to FIG. 5(a), in a case where the output gear 23 is caused somehow to rotate clockwise (in the direction of arrow C) at a greater angular velocity than the input gear while the input gear 20 is rotating clockwise (in the direction of arrow A), the output gear 23 causes the pawl member 21 to turn clockwise to bring about a condition just like the condition shown in FIG. 5(b) because the pawl carrying plate 22 turns slower than the output gear 23 and faster than the input gear 20. In that event, therefore, the output gear 23 is able to rotate without affecting the rotation of the input gear 20 at all.

Figure 2:
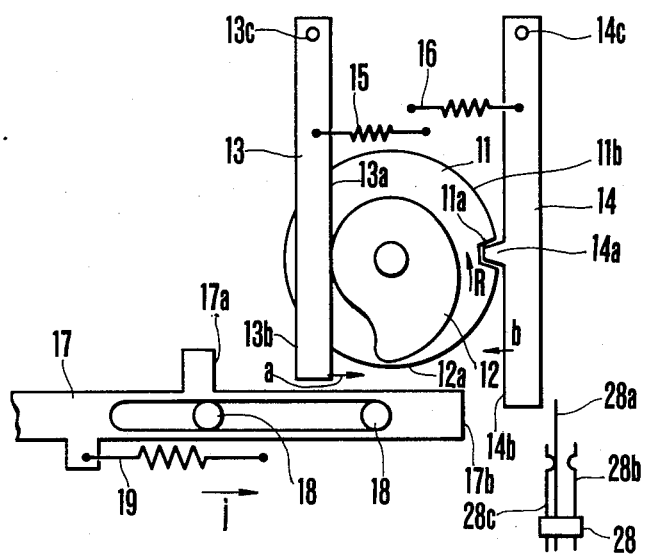
FIG. 2 is a plan view showing a feeding mechanism included in the embodiment shown in FIG. 1.

The arrangement of the other one-way clutches 4 and 5 is similar to that of the one-way clutch 3 described above with the exception that the direction in which the pawl member 21 is mounted and the direction of the claws of the ratchet 23a which are arranged to engage the claw 21b of the pawl member 21 differ from those of the clutch 3 and are oppositely arranged. Therefore, details of the other clutches 4 and 5 are omitted from the present description. The operation of these other clutches is also similar to that of the clutch 3 except that they differ in transmitting direction. With the one-way clutches arranged in this manner, the embodiment of the invention operates in the manner described hereinafter:

In FIG. 1, the camera is shown loaded with film 10 and having the perforations of the fore end portion of the film engaged with the teeth 8' of the sprocket 8. Meanwhile, the fore end of the film 10 is arranged to be wound round the spool 9 by means of an automatic loading mechanism which is not shown. Under this condition, when the AF mechanism and the shutter mechanism are actuated by depressing a release button which is not shown, the shutter travels. Upon completion of the shutter travel, the charge plate 17 shown in FIG. 2 is unlocked and is moved by the spring 19 in the direction of the arrow j. This movement of the charge plate 17 causes the winding stop lever 14 to turn counterclockwise. The counterclockwise turn of the lever 14 renders the operating piece 28a and the terminal 28b of the switch 28 conductive. At that instinct, the operating pieces 26a and 27a of other switches 26 and 27 are in a conductive state in conjunction with the terminals 26b and 27b respectively. Therefore, with the operating piece 28a and the terminal 28b having become conductive, power supply to the motor 1 begins. The motor then begins to rotate in the film winding direction.

The rotation of motor 1 in the film winding direction causes the input shafts (corresponding to the input gear 20 as shown in FIG. 4) of the one-way clutches 3, 4 and 5 to rotate counterclockwise (or in the directions of arrows d and e). This brings the one-way clutch 3 into a non-transmissive state irrespective of the rotating direction of the output shaft thereof (corresponding to the output gear 23 of FIG. 4). The output shaft is then kept in a freely rotatable state. Other one-way clutches 4 and 5 on the other hand become transmissive because the rotation of their input shafts is in the counterclockwise direction. The clutches 4 and 5 thus cause the sprocket 8 and the spool 9 which are in association with their output shafts to rotate counterclockwise. As a result of this, the film 10 is fed in the winding direction (or in the direction of arrow f). Further, since the film 10 has not been wound round the spool 9 at that time, the film 10 is not fed by the rotation of the spool 9 but is fed by the rotation of the sprocket 8. The film winding operation in this instance is thus performed in the manner of a sprocket drive type mechanism. In other words, the film 10 is moved toward the spool 9 even if the force end of the film 10 has not yet reached the spool 9.

The counterclockwise rotation of the sprocket 8 is transmitted via the one-way clutch 6 to the dividing plate 11. The charge cam 12 which is secured to the dividing plate 11 then also rotates counterclockwise to push the operation lever 13 with the cam face 12a thereof. The operation lever 3 is thus pushed to turn clockwise. The end part 13a of the operation lever 13 then pushes the engagement piece 17a of the charge plate 17 to move the charge plate 17 to the left as viewed on the drawing (or reverse to the direction of arrow j). The leftward movement of the charge plate 17 charges the AF and shutter mechanisms which are not shown. After that, the charge plate 17 is locked in a charge completion position by means of a locking mechanism which is not shown.

Further, in response to the above-stated movement of the charge plate 17, the winding stop lever 14 tries to turn clockwise by virtue of the urging force of the spring 16. However, the groove 11a of the dividing plate 11 is then located outside the position shown in the drawing and thus allows the protrudent part 14a to abut upon the peripheral face of the dividing plate 11. This causes the winding step lever 14 to be kept in a position to have the operating piece 28a of the switch 28 in contact with the terminal 28b. Following this, when one frame portion of the film 10 is wound up with the sprocket 8 having completed one turn, the groove 11a of the dividing plate 11 comes back to its original position. The protrudent part 14a of the winding stop lever 14 then comes to enter the groove 11a to stop the dividing plate 11 from rotating. At the same time, the operating piece 28a of the switch 28 is shifted into contact with the terminal 28c. This brings the power supply to the motor 1 to a stop. Then, a motor short circuit is formed to quickly bring the rotation of the motor 1 to a stop.

The film 10 is taken up on the spool 9 through the medium of an automatic loading mechanism which is not shown with the blank feeding process repeated a specified number of times in the manner described in the foregoing until the loaded film 10 is brought into a position with a frame ready for exposure. After that, film feeding or winding is accomplished by the rotation of the spool 9. With this condition having been obtained, the embodiment operates in the manner described hereinafter when the switch 28 is operated by the above-stated action of the charge plate 17 to start power supply to the motor 1.

As has been mentioned in the foregoing, the angular velocity of the output shaft of the one-way clutch 4 which is interlocked with the sprocket 8 is arranged to be faster than that of the input shaft of the one-way clutch 4 in this case. Therefore, the claw 21b of the pawl member 21 of FIG. 4 cannot be engaged with the ratchet 23a even if the pawl member 21 turns in the direction of engaging its claw 21b with the ratchet 23a. Therefore, the driving force of the motor 1 cannot be transmitted to the output shaft of the one-way clutch 4. When the film 10 is wound up by the spool 10, therefore, the one-way clutch 4 is in a non-transmissive state and the sprocket 8 is rotated solely by the feeding movement of the film 10. In other words, film winding is accomplished in the spool drive type manner under this condition. Further, since other mechanisms operate in the same manner under this condition as has been described in the foregoing, they require no further description.

The film rewinding operation of the embodiment is initiated when a rewinding operation member which is not shown is operated to bring the operating pieces 26a and 27a of the switches 26 and 27 into contact with the terminals 26c and 27c. This switching operation of the switches 26 and 27 causes power supply to the motor 1 to be effected in a direction reverse to the direction in which the power supply is effected to the motor 1 at the time of film winding. The motor 1 therefore rotates in the rewinding direction. As a result of that, the input shafts of the one-way clutches 3, 4 and 5 come to rotate clockwise (or in the direction of arrow c). This brings the one-way clutch 3 into a transmissive state to rotate the fork 7 clockwise. With the fork 7 thus rotating clockwise, the film 10 is rewound within the magazine. In this instance, the pawl members 21 of the one-way clutches 4 and 5 turn in the direction with their claws 21a not engaging with the ratchet 23a. Accordingly, the clutches 4 and 5 are kept in a non-transmissive state irrespective of the rotation of their output shafts. In other words, the rotation of their output shafts is never transmitted to their input shafts even if their output shafts rotate clockwise with the sprocket 8 and the spool 9 rotated in the rewinding direction.

Further, in this instance, the input shaft of the one-way clutch 6 also rotates clockwise. Therefore, the rotation of the sprocket 8 is never transmitted to the dividing plate 11. The plate 11 does not rotate. When the motor 1 rotates in the rewinding direction, therefore, it is only the one-way clutch 3 that becomes transmissive to have the film 10 rewound by the fork 7.

Figure 6:
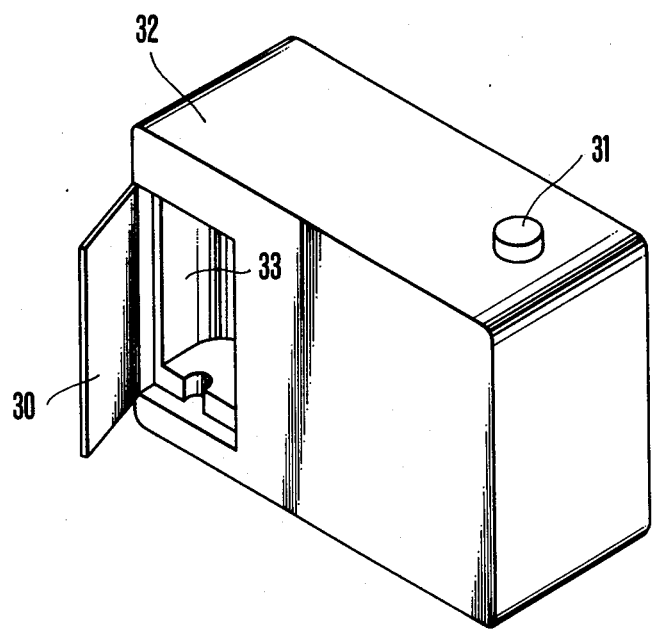
FIG. 6 is an oblique view of a camera body.
Figure 7:
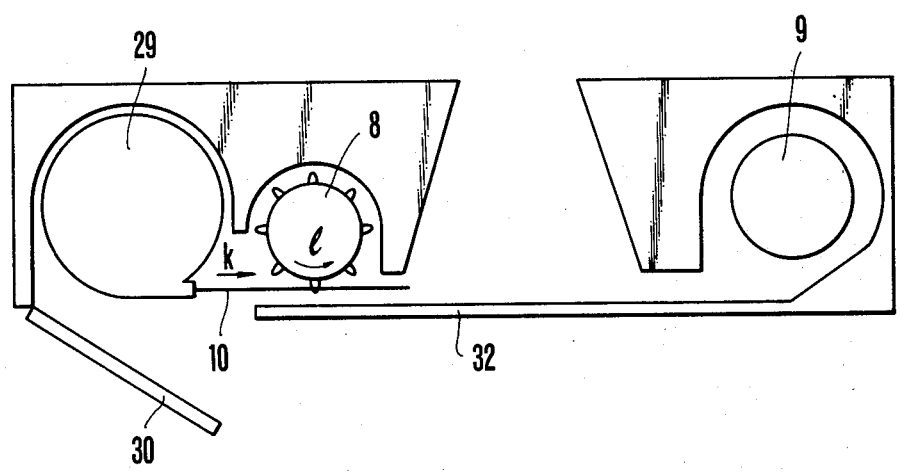
FIG. 7 is a sectional view of the camera body.

FIG. 6 is an oblique view showing a camera body to which this embodiment of the invention is applied. In the fase of this embodiment, the sprocket 8 is disposed close to the magazine as shown in FIG. 7. The camera includes a release button 31; the camera body 32; a magazine chamber 33; and a back cover 30 which is arranged to cover only the rear portion of the magazine chamber 33. The back cover 30 is arranged in this manner because, in accordance with the winding device embodying the present invention, the film 10 can be taken up on the spool 9 by just engaging the fore end of the film 10 with the sprocket at the time of film loading. This permits reduction in size of the back cover 30. It is only the magazine chamber 33 that can be seen when the back cover is opened. This is advantageous in terms of design. Besides, dust is less readily admitted to the inside of the camera body 32. A further advantage resides in that, compared with other cameras having the conventional back covers, the invented arrangement makes available additional frames for photographing, because the film 10 is exposed to light only at its fore end at the time of film loading.

In accordance with the invention, a one-way clutch capable of maintaining a non-transmissive state by virtue of the absolute rotating direction of the input shaft thereof is arranged to be able to transmit the driving force of the motor when the motor rotates in the film winding direction. Therefore, a charging action can be accomplished on photo taking mechanisms irrespective of whether the camera is loaded with film. Besides, the invented arrangement obviates the fear that the film cannot be rewound at a desired high speed due to a load imposed on the film, because in accordance with the invention the driving force of the drive source is never transmitted to the sprocket at the time of film rewinding so that film rewinding can be accomplished without any difficulty.

Similar one-way clutches are provided between the spool and the drive source and between the fork and the drive source for switch-over between the film winding and rewinding actions of the camera. This permits switch-over from the winding action to the rewinding action and vice versa without shifting the engagement of the transmission gear arrangement, so that the winding and rewinding actions can be accomplished with the same source of driving force to permit simplification of the mechanism required for transmission of the driving force.

While a specific embodiment of the invention has been shown and described in detail to illustrate the application of the inventive principles, it will be understood that the invention may be embodied otherwise without departing from such principles.

What we claim is:

1. A film winding device for a camera, comprising:
   a motor selectively rotatable in a film winding direction and a film rewinding direction;
   a film takeup spool;
   a sprocket selectively rotatable in the film winding direction and in the film rewinding direction, said sprocket being provided with teeth engageable with perforations provided in the film;
   shutter charging means charged through said sprocket;
   film rewinding means; and
   first clutch means which transmits the rotation of said motor to said sprocket, said first clutch means having an input side connected to said motor and an output side connected to said sprocket, wherein said first clutch means invariably retains a non-transmissive state when said input side rotates in a rewinding direction regardless of the rotating speed and rotating direction of said output side and retains a transmissive state for transmitting the rotation of the motor to the sprocket, and the shutter charging means when said input side rotates in a winding direction and at a faster speed than said output side, said first clutch means retaining a nontransmissive state when said input side rotates in a winding direction and the rotating speed of said output side is faster than the rotating speed of the input shaft.

2. A film winding device for a camera according to claim 1, further comprising a second clutch means which is a one-way clutch having an input shaft connected to said motor and an output shaft connected to the film takeup spool, wherein said clutch retains a nontransmissivve state at least when its input shaft rotates in the film rewinding direction.

3. A film winding device according to claim 1 or 2, further comprising a third clutch means which is a one-way clutch having an input shaft connected to said motor and an output shaft connected to said film rewinding means, wherein said clutch retains a nontransmissive state at least when its input shaft rotates in the film winding direction.

4. A film winding device according to claim 3, further including a fourth one-way clutch which is arranged to transmit only the rotation of said sprocket in the film winding direction to said shutter charging means.

5. A film winding device according to claim 1 or 2, wherein the output shaft of said first clutch means is arranged to rotate at a speed faster than that of the input shaft of said first clutch means when said sprocket receives a rotating force from said film takeup spool through the film.

6. A film winding device according to claim 1, further including a further one-way clutch which is arranged to transmit only the rotation of said sprocket in the film winding direction to said shutter charging means.

7. A film winding device according to claim 2, further including a further one-way clutch which is arranged to transmit only the rotation of said sprocket in the film winding direction to said shutter charging means.

* * * * *